(12) United States Patent
Miller et al.

(10) Patent No.: US 11,174,642 B2
(45) Date of Patent: Nov. 16, 2021

(54) GUTTER PROTECTION ASSEMBLY

(71) Applicants: Bradley Thomas Miller, Galena, OH (US); Alex Borodyanskiy, Girard, OH (US); David R Brainard, Kennedy, NY (US)

(72) Inventors: Bradley Thomas Miller, Galena, OH (US); Alex Borodyanskiy, Girard, OH (US); David R Brainard, Kennedy, NY (US)

( * ) Notice: Subject to any disclaimer, the term of this patent is extended or adjusted under 35 U.S.C. 154(b) by 0 days.

(21) Appl. No.: 16/784,388

(22) Filed: Feb. 7, 2020

(65) Prior Publication Data

US 2021/0246659 A1 Aug. 12, 2021

(51) Int. Cl.
*E04D 13/064* (2006.01)
*B01D 35/28* (2006.01)

(52) U.S. Cl.
CPC .......... *E04D 13/064* (2013.01); *B01D 35/28* (2013.01)

(58) Field of Classification Search
CPC .............. E04D 13/076; E04D 13/0765; E04D 13/0725; E04D 13/0445; E04D 13/064; E04D 13/0641; E04D 13/0643; E04D 13/068; E04D 13/0685; E04D 13/072
See application file for complete search history.

(56) References Cited

U.S. PATENT DOCUMENTS

| | | | |
|---|---|---|---|
| 5,067,675 A * | 11/1991 | Brant | E04D 13/0725 248/48.2 |
| 5,216,852 A | 6/1993 | Bemis et al. | |
| 5,303,517 A | 4/1994 | Schneider et al. | |
| 5,617,678 A * | 4/1997 | Morandin | E04D 13/0725 248/48.2 |
| 5,845,435 A * | 12/1998 | Knudson | E04D 13/076 52/11 |
| 6,701,674 B1 * | 3/2004 | Albracht | E04D 13/0725 52/11 |
| 6,993,870 B2 * | 2/2006 | McDonald | E04D 13/0481 52/11 |
| 7,584,576 B2 * | 9/2009 | McDonald | E04D 13/0481 248/48.1 |
| 7,752,812 B2 * | 7/2010 | Knudson | E04D 13/0725 52/12 |
| 2004/0000098 A1 * | 1/2004 | Knudson | E04D 13/0725 52/12 |
| 2009/0235592 A1 * | 9/2009 | Knudson | E04D 13/076 52/12 |

(Continued)

*Primary Examiner* — Babajide A Demuren
(74) *Attorney, Agent, or Firm* — Ashok Tankha

(57) ABSTRACT

A gutter protection assembly includes a frame, stanchions, and a mesh. The frame includes a rear brace and a supporting flange. The supporting flange is detachably attached to a front lip of a gutter using fasteners. The frame is defined by a series of alternating parallel ridges and a series of parallel channels such that each of the parallel channels define equally spaced openings. Each of the two self-supported stanchions include a base portion, an elongate stem portion inclined relative to the base portion, and two jaw portions extending from an end of the elongate stem portion that include a support clip for receiving adjacent portions of parallel ridges of the frame to define a space between a rear lip of the gutter and the rear brace of the frame. A mesh covers the frame to filter debris through the gutter.

9 Claims, 13 Drawing Sheets

(56) References Cited

U.S. PATENT DOCUMENTS

| | | | |
|---|---|---|---|
| 2013/0248672 A1* | 9/2013 | Martin | E04D 13/0725 248/312.1 |
| 2017/0044771 A1 | 2/2017 | Breyer et al. | |
| 2019/0063070 A1 | 2/2019 | Cullen | |

* cited by examiner

GUTTER PROTECTION ASSEMBLY

BACKGROUND

It is important to protect buildings from water damage when it rains. When it rains, water may leak from the roof and percolate down the side walls and damage the walls of the building. Prior art discloses various measures that may be taken to address this problem. The most common method to collect and divert water falling on the roof is the use of gutters, where the gutter is installed along the edge of the roof top of the building.

Roof gutters are generally constructed using extruded plastic, for example, polyvinylchloride. Other materials of construction comprise steel, copper, plastic, etc. Plastic is generally preferred due to its flexibility. Even though plastic makes the gutter light weight and flexible during the assembly process, conventional roof gutter design have several deficiencies. One of the most common problems is the accumulation of debris in the gutter, which prevents water from flowing freely along the length of the gutter. Debris comprises tree leaves, dust, etc., that accumulate at the edge of the roof tops. Another problem is the issue of excess water run-off from the edge of the gutter, which occurs when there is a heavy rain and the gutter is clogged by debris.

One common conventional measure to prevent accumulation of debris in the gutter is installation of a mesh in the gutter. Even though the mesh minimizes accumulation of the debris in the gutter, the mesh results in water run-off during heavy rainfall. The mesh is currently generally positioned at a certain angle in the gutter to prevent water run-off, but in most cases, the run-off is not completely prevented. The mesh is positioned on top of the gutter using a supporting element in the gutter, for example, the lip and the flange of the gutter to connect and secure the mesh to the gutter. This reduces the risk of positioning the mesh in different orientations in the gutter.

If the supporting element is designed to use the roof line to support the rear of the supporting element, then the angle of elevation cannot be adjusted. Furthermore, if the supporting element is designed to use the internal gutter hanger/bracket to support the mesh, then the supporting element cannot position the mesh at a position higher than the hanger/bracket. Another problem is that the angle of elevation of the mesh that is supported by conventional supporting elements cannot be adjusted suitably. This type of installation also allows for a phenomenon referred to as "ice damming", where water is allowed to back up against the roof. As temperatures fall and the water begins to freeze against the shingle and build underneath due to the gutter and mesh breaking the tar or the ice and water barrier.

Hence, there is a long felt need for a mesh that prevents accumulation of debris in the gutter and prevents excess water run-off from the gutter. There is also a long felt need for a self-supporting mesh in the gutter. There is also a long felt need for a mesh that allows maximum water to enter the gutter notwithstanding debris accumulation in the gutter.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The gutter protection assembly disclosed herein addresses the need for a self-supporting mesh that prevents accumulation of debris in a gutter and prevents excess water run-off. The gutter protection assembly disclosed herein addresses the need for a mesh that allows debris accumulation in the gutter but allows maximum water to enter the gutter. A gutter protection assembly, disclosed herein, comprises a frame, at least two stanchions, and a mesh. The frame is defined by, for example, a corrugated shape frame, comprising a rear brace and a supporting flange.

In an embodiment, the supporting flange is configured to be detachably attached to a front lip of a gutter using one or more fasteners, wherein the corrugated shape of the frame is defined by a series of alternating parallel ridges extending longitudinally along a length of the frame and a series of parallel channels extending transversely along a width of the frame. Each of the parallel channels define a plurality of approximately equally spaced openings. In an embodiment, at least two self-supported stanchions are configured to support adjacent portions of parallel ridges of the frame to define a space between a rear lip of the gutter and the rear brace of the frame. Each of the at least two self-supported stanchions comprise a base portion, an elongate stem portion, and at least two jaw portions. The elongate stem portion extends from the base portion, wherein the elongate stem portion is adjustably inclined relative to the base portion.

The at least two jaw portions extend from an end of the elongate stem portion distal from the base portion, such that each of the at least two jaw portions comprise a support clip configured to receive a portion of the parallel ridges of the frame, wherein the support clip allows the inclination of the two self-supported stanchions to be adjusted to reduce water run-off by manually moving the support clip from one crest section to another crest section. The mesh covers the frame to filter and prevent debris from entering the gutter. In an embodiment, an extension of the frame between the rear brace and the supporting flange comprises a plurality of crest sections and trough sections, wherein the crest sections are configured to receive the support clip and the trough sections are configured to provide support to hold debris along with the mesh.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

It is to be understood by the reader that the invention disclosed herein is not limited to the details of the construction, materials and embodiments as illustrated in the accompanying drawings, as the invention concepts are capable of other embodiments and of being practiced and realized in various ways by applying the disclosure presented herein.

Figure 1A:
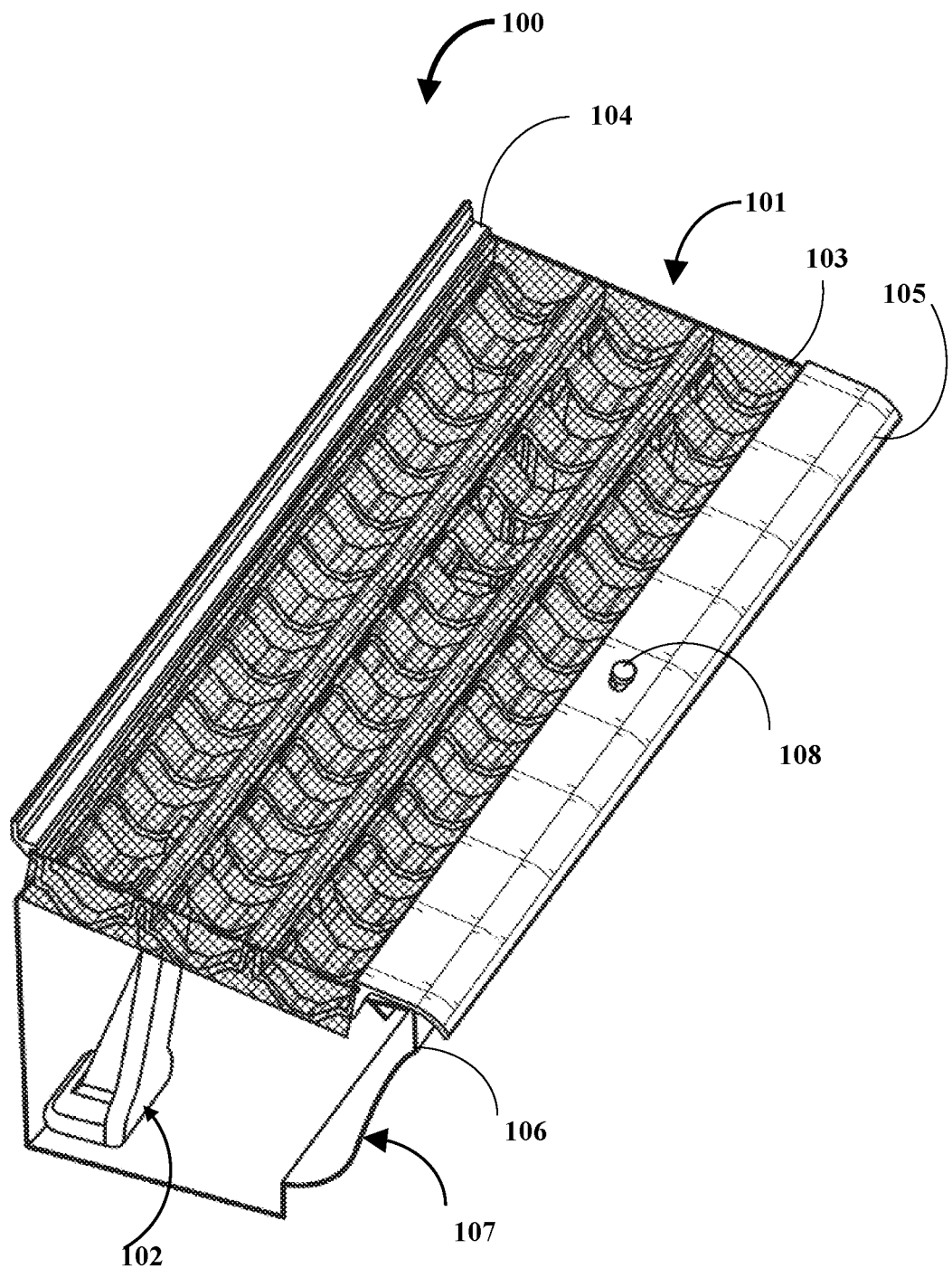
FIG. 1A exemplarily illustrates a top perspective view of a gutter protection assembly with the mesh.
Figure 1B:
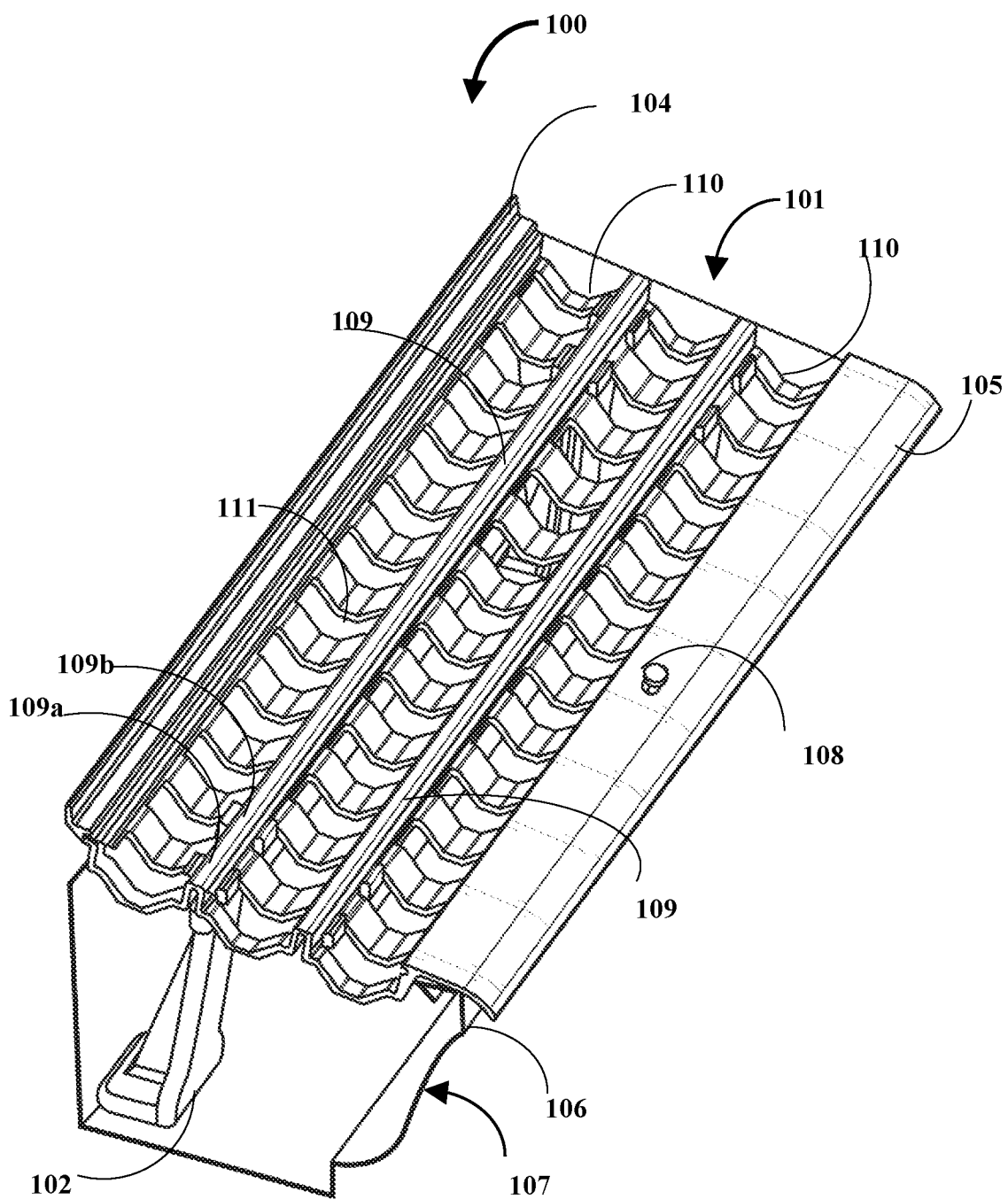
FIG. 1B exemplarily illustrates top perspective view of a gutter protection assembly without the mesh.
Figure 1C:
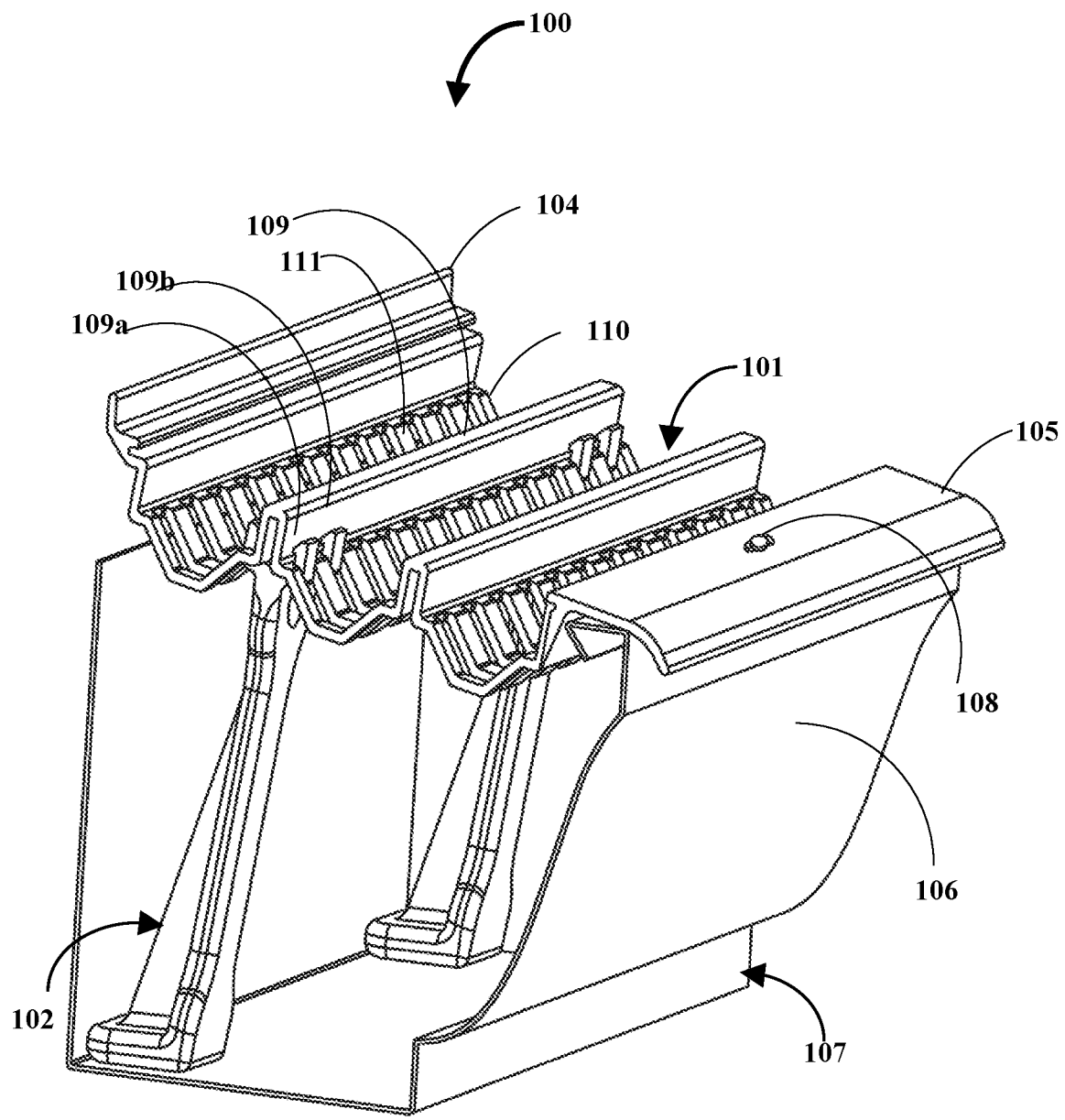
FIG. 1C exemplarily illustrates another top perspective view of a gutter protection assembly without the mesh.
Figure 1D:
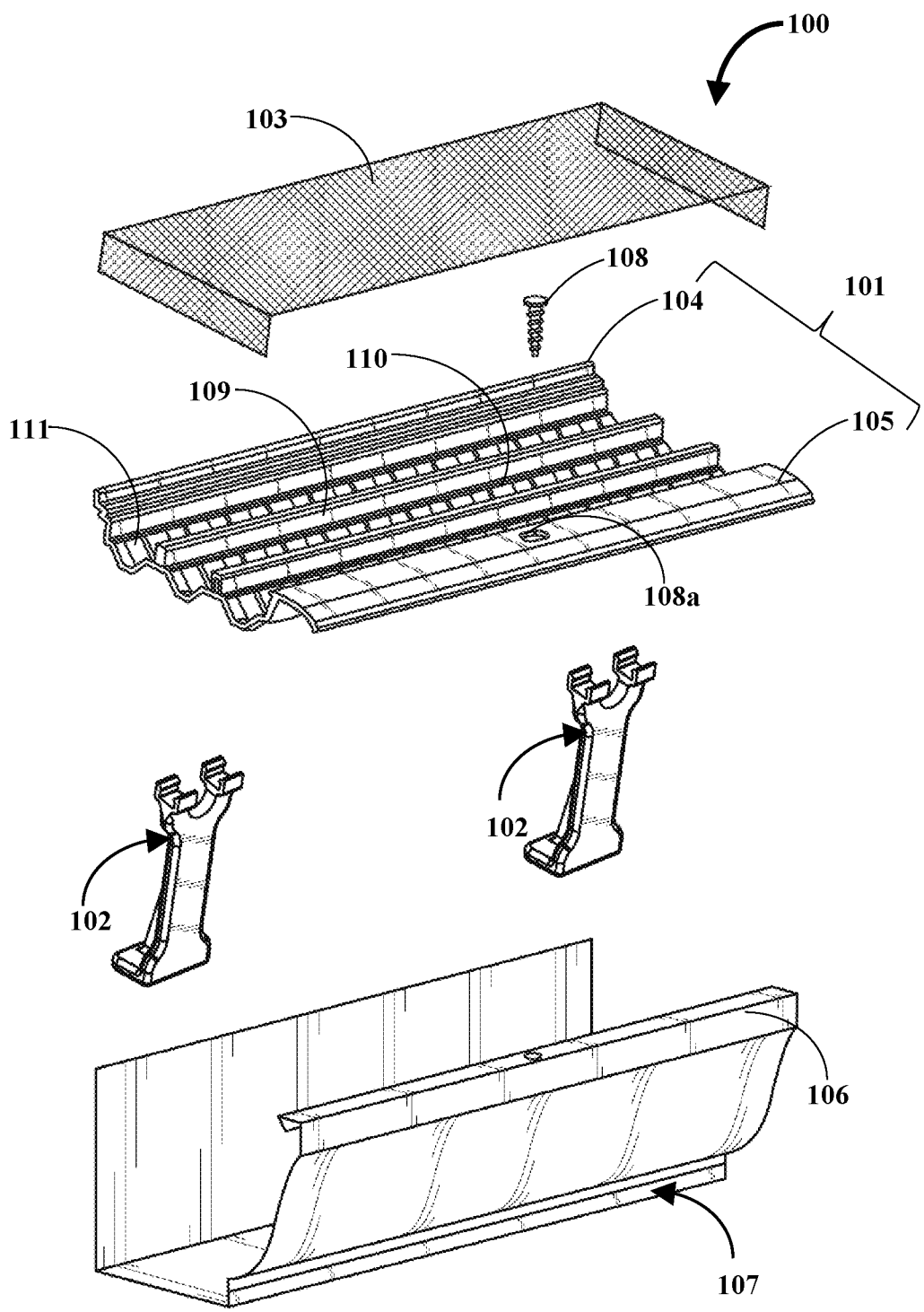
FIG. 1D exemplarily illustrates an exploded view of a gutter protection assembly.

FIG. 1A exemplarily illustrates a top perspective view of a gutter protection assembly 100 with the mesh 103. FIGS. 1B and 1C exemplarily illustrate top perspective views of a gutter protection assembly 100 with and without the mesh 103 respectively. FIG. 1D exemplarily illustrates an exploded view of a gutter protection assembly 100. The gutter protection assembly 100 includes a frame 101, at least two self-supported stanchions 102, and a mesh 103. The frame 101 is, for example, of a corrugated shaped frame comprising a rear brace 104 and a supporting flange 105. The supporting flange 105 is configured to be detachably attached to a front lip 106 of the gutter 107 using one or more fasteners 108. The fastener 108 passes through a hole 108a in the profile of the gutter 107 to attach the frame 101 to the gutter 107, as shown in FIGS. 1C and 1D. In an embodiment, the fasteners 108 comprise a screw thread fastener, a threaded bolt fastener, a rivet fastener, etc. In an embodiment, the corrugated shape of the frame 101 is defined by a series of alternating parallel ridges 109 extending longitudinally along a length of the frame 101 and a series of parallel channels 110 extending transversely along a width of the frame 101 such that each of the parallel channels 110 define a plurality of equally spaced openings 111 for allowing water to flow through to the gutter 107 as illustrated in FIG. 1B. In an embodiment, the two self-supported stanchions 102 are configured to support adjacent portions 109a, 109b of parallel ridges 109, as shown in FIG. 1B, of the frame 101 to define a space 112 between a rear lip 113 of the gutter 107 and the rear brace 104 of the frame 101 as exemplarily illustrated in FIGS. 2A and 2B.

Figure 2A:
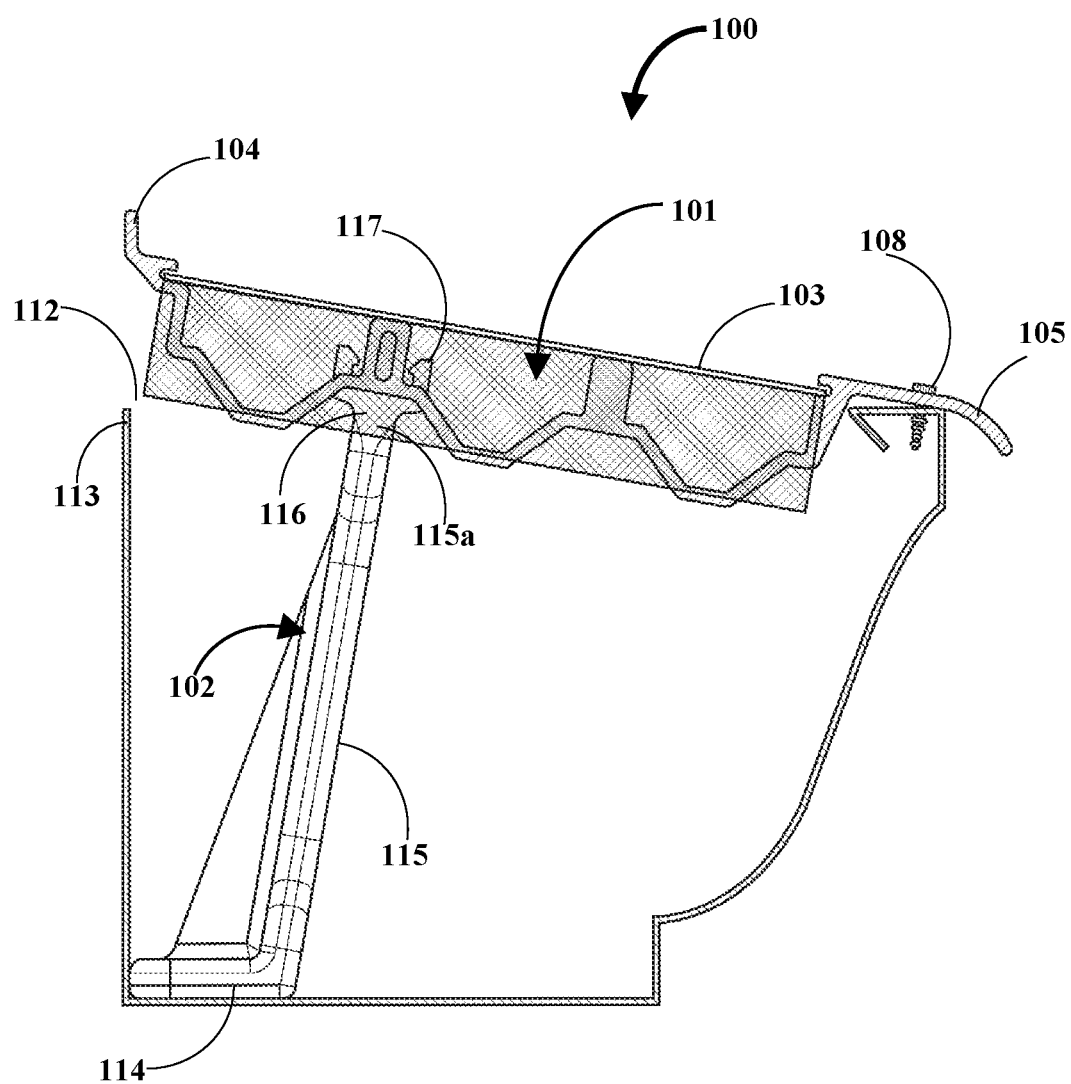
FIG. 2A exemplarily illustrates a cross-sectional view of a gutter protection assembly with the mesh.
Figure 2B:
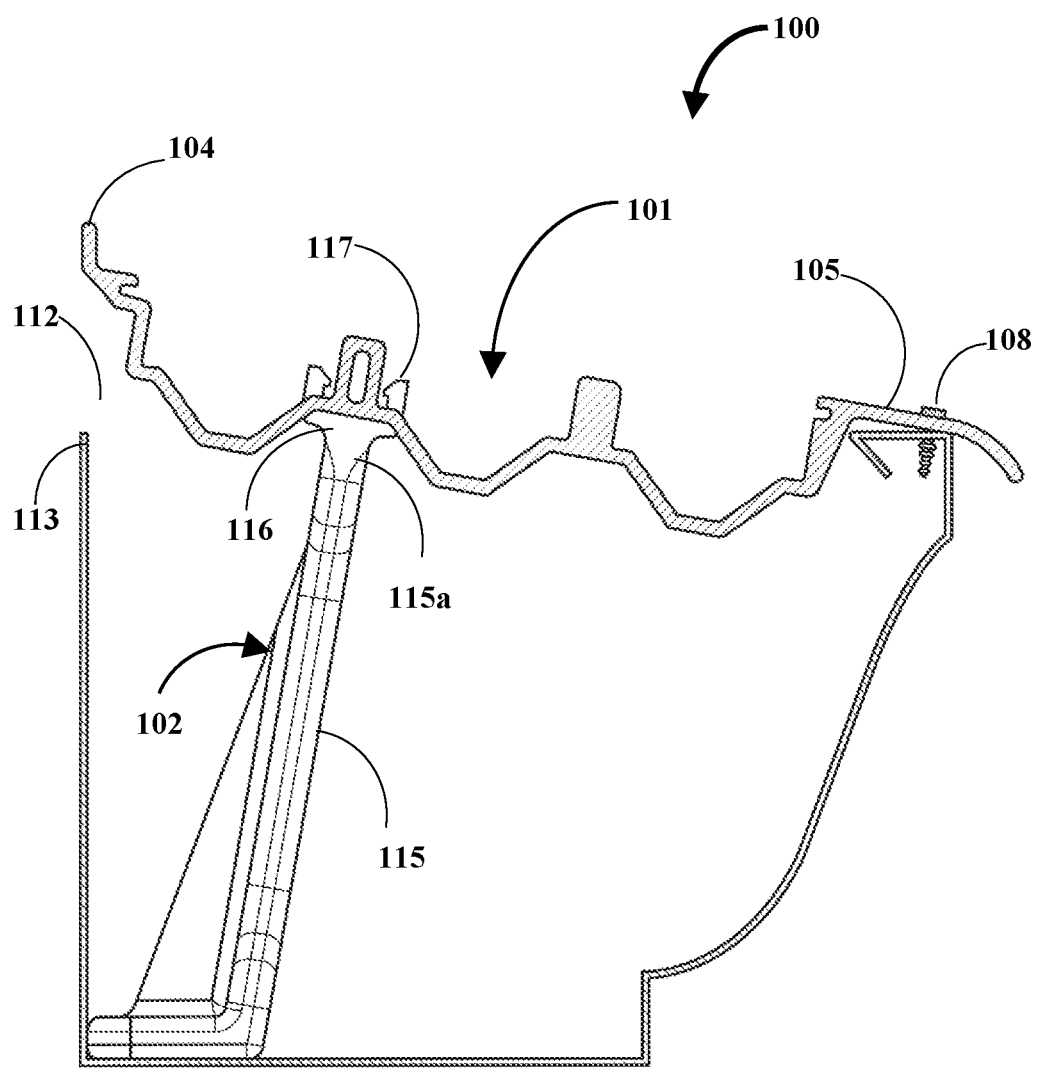
FIG. 2B exemplarily illustrates a cross-sectional view of a gutter protection assembly without the mesh.

FIGS. 2A and 2B exemplarily illustrate a cross-sectional view of a gutter protection assembly 100 with and without the mesh 103 respectively. The gutter protection assembly 100 comprises the frame 101, at least two self-supported stanchions 102, and a mesh 103 as disclosed in the detailed description of FIGS. 1A-1D. The two self-supported stanchions 102 are free standing in orientation after assembly without the support of any adjacent surfaces of the frame 101. The two self-supported stanchions 102 are configured to support adjacent portions 109a, 109b of the parallel ridges 109 of the frame 101 to define a space 112 between a rear lip 113 of the gutter 107 and the rear brace 104 of the frame 101. The space 112 allows the degree of inclination of the two self-supported stanchions 102 to be adjusted, so that the mesh 103 is positioned at a predetermined angle.

Figure 3C:
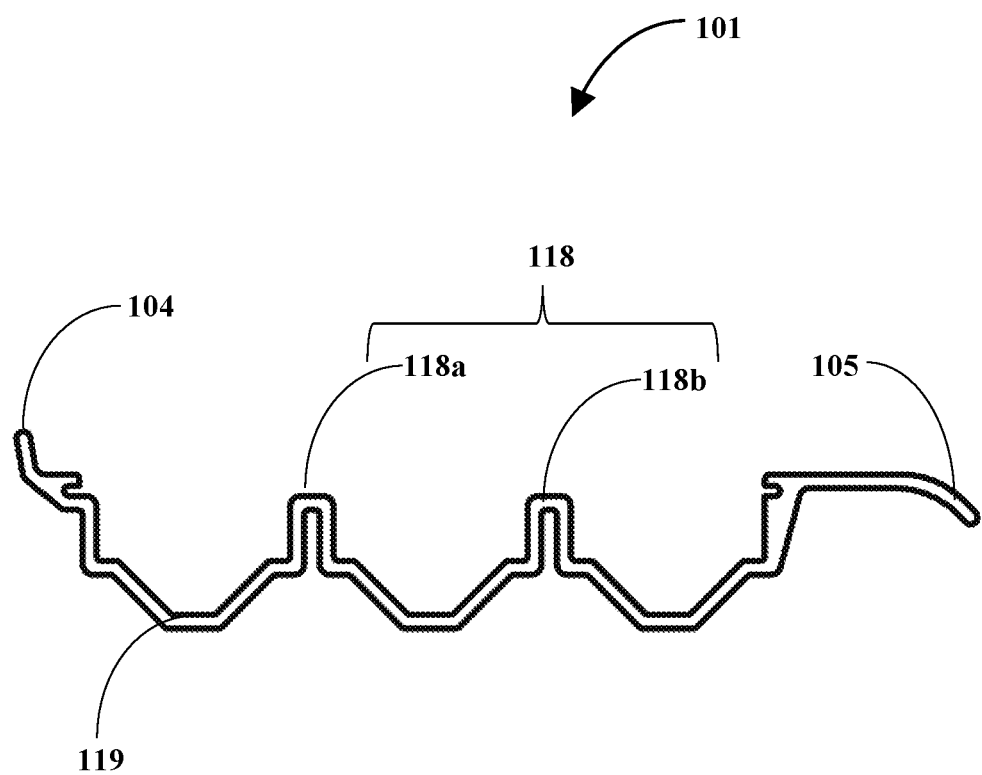
FIG. 3C exemplarily illustrates a side view of the frame of the gutter protection assembly.
Figure 4A:
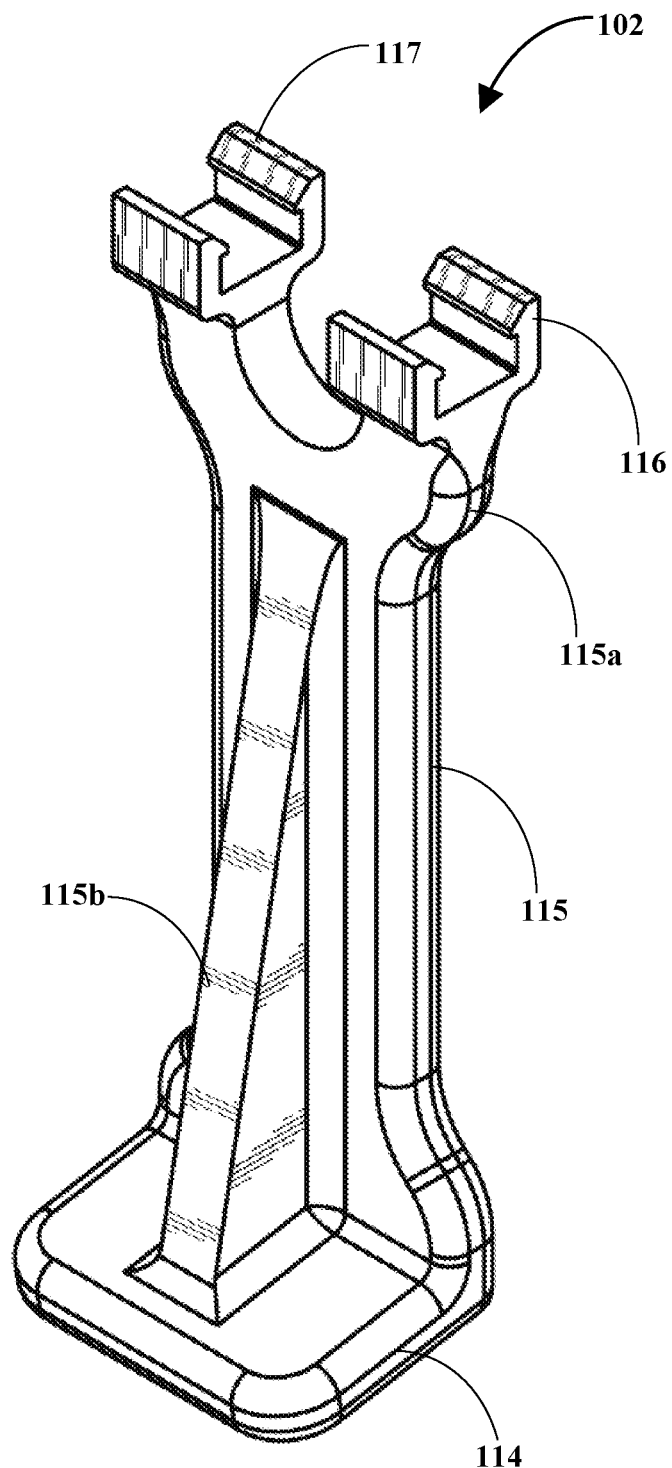
FIG. 4A exemplarily illustrates a top perspective view of a self-supported stanchion of the gutter protection assembly.
Figure 4B:
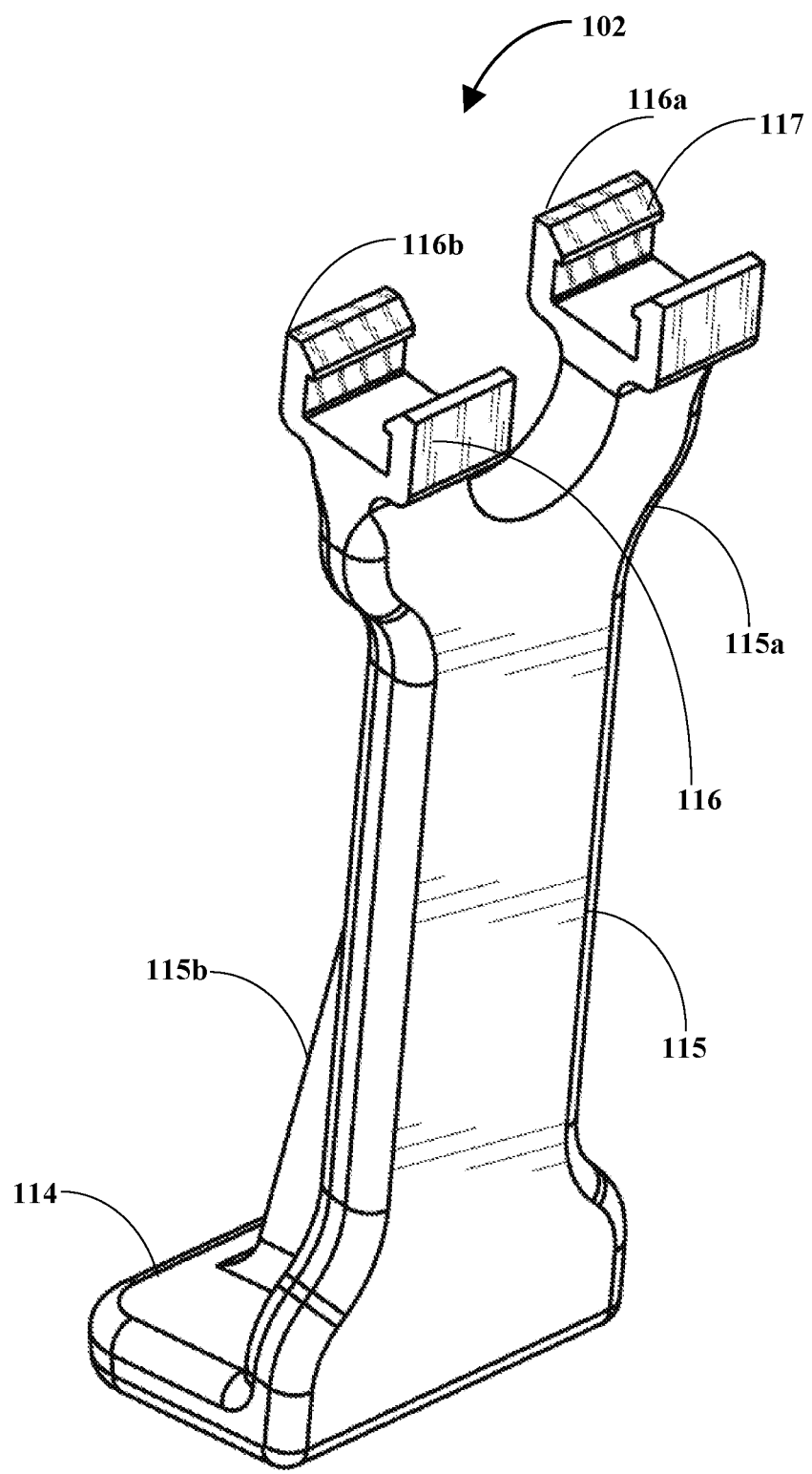
FIG. 4B exemplarily illustrates another top perspective view of the self-supported stanchion of the gutter protection assembly.
Figure 4C:
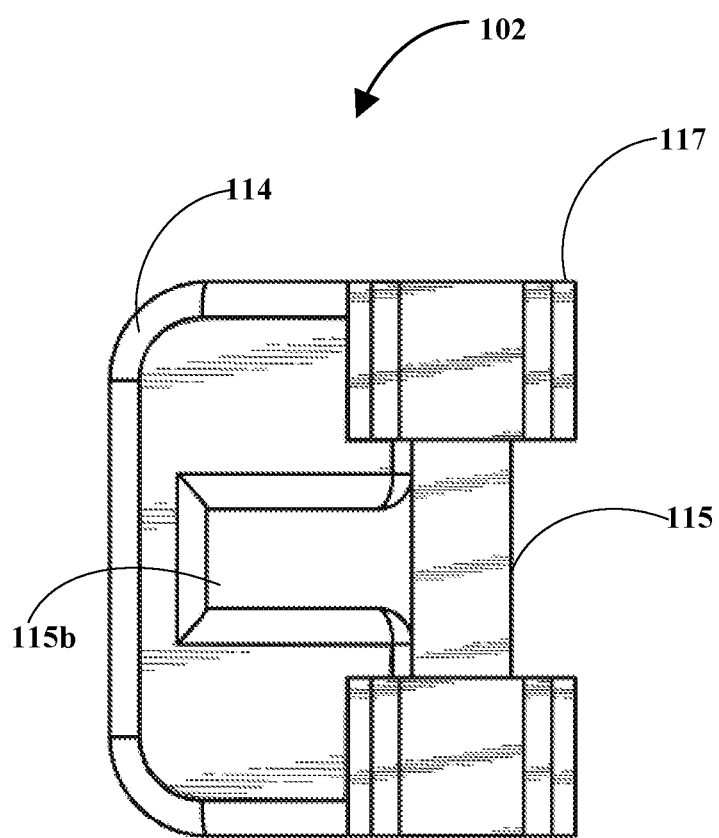
FIG. 4C exemplarily illustrates a top view of the self-supported stanchion of the gutter protection assembly.
Figure 4D:
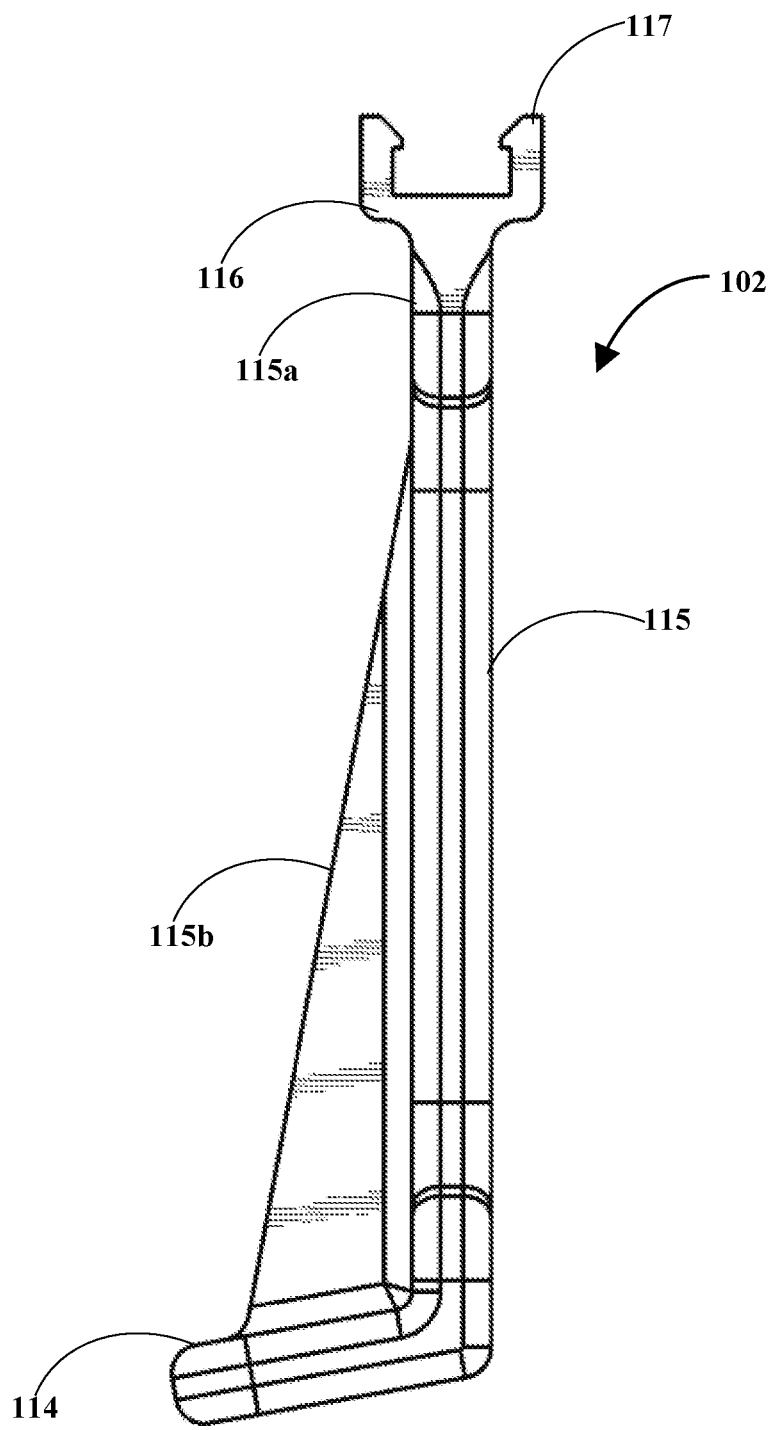
FIG. 4D exemplarily illustrates a font view of the self-supported stanchion of the gutter protection assembly.

Each of the at least two self-supported stanchions 102 comprise a base 114, an elongate stem 115 extending from the base portion 114, wherein the elongate stem 115 is adjustably inclined relative to the base portion 114, and at least two jaw portions 116, as exemplarily illustrated in FIG. 4B. The jaw portions 116 extend from an end 115a of the elongate stem portion 115 that is distal from the base 114. Each of the at least two jaw portions 116 comprise a support clip 117 configured to receive a portion of the parallel ridges 109 of the frame 101 as disclosed in the detailed description of FIGS. 1A-1D. The support clip 117 is adjustable to allow the inclination of the two self-supported stanchions 102 to be adjusted to reduce water run-off from the edge of the gutter, by manually shifting the support clip 117 from one crest section 118 to another crest section 118 as further explained in the description of FIG. 3C. In an embodiment, the rear of the frame 101 is supported by the support clip 117 and the front of the frame 101 is supported by the front lip 106 of the "K" style gutter 107 and is affixed with a ¼-inch stainless screw. The gutter protection assembly 100 is configured to fit, for example, a ⅝ inch "K" style gutter.

Figure 3A:
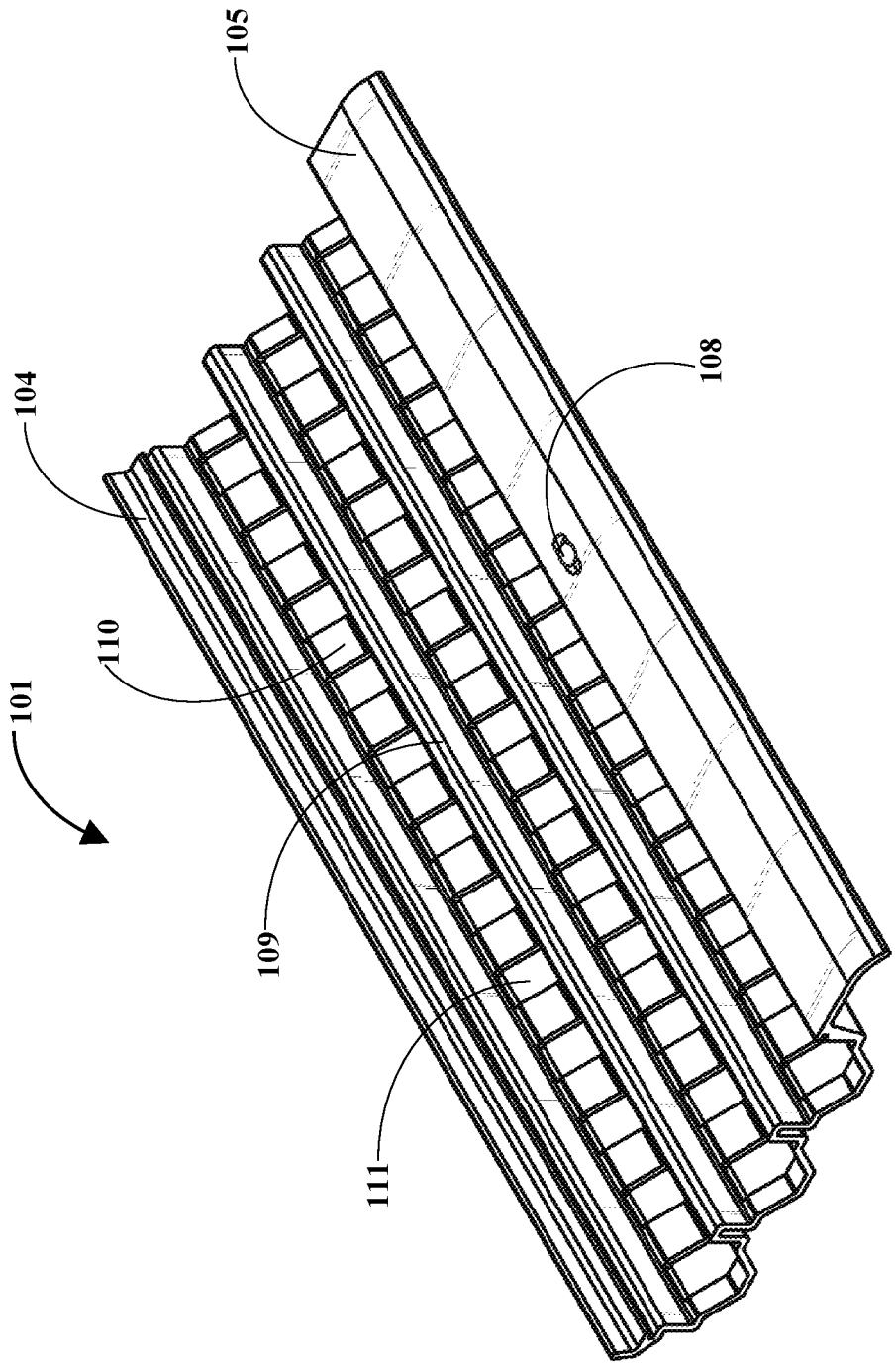
FIG. 3A exemplarily illustrates a top perspective view of the frame of the gutter protection assembly.
Figure 3B:
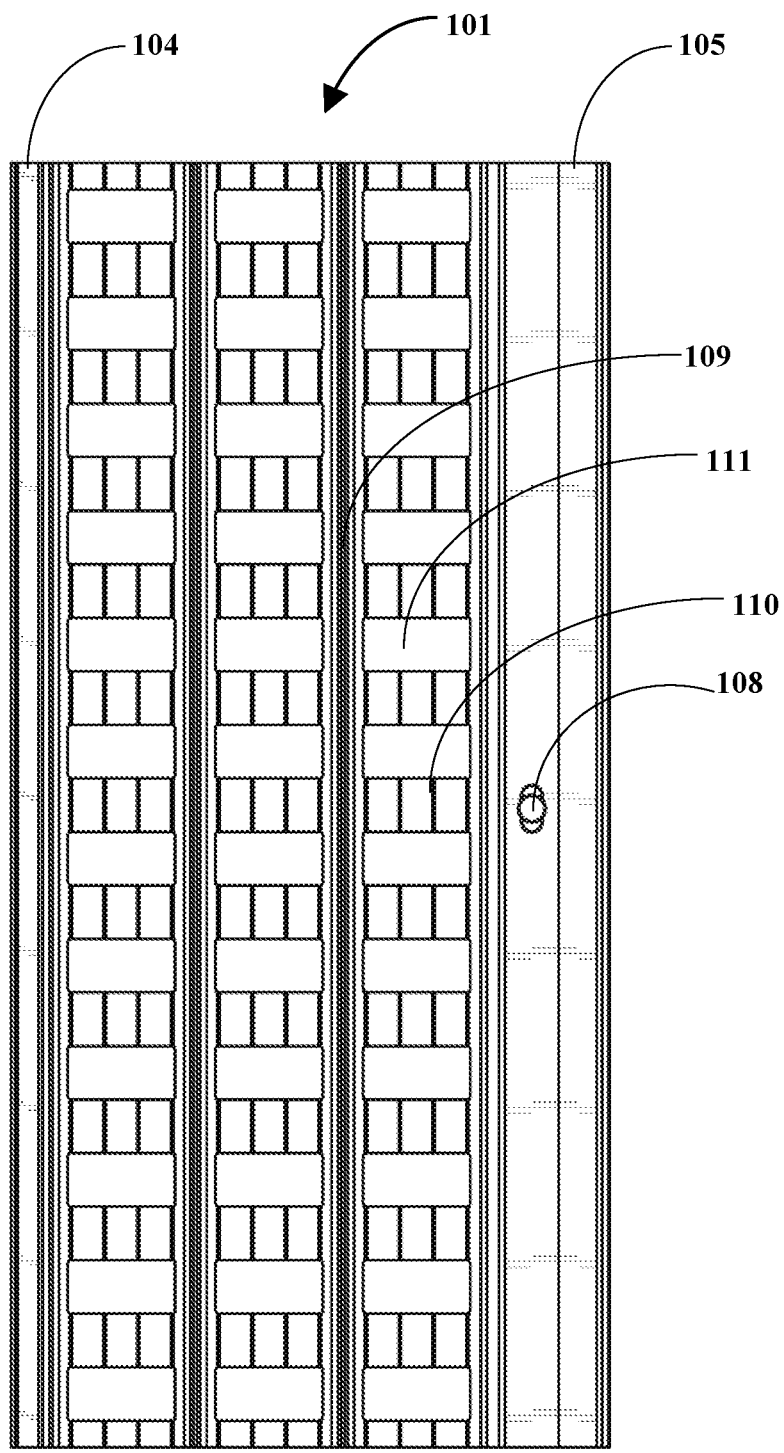
FIG. 3B exemplarily illustrates a top plan view of the frame of the gutter protection assembly.

FIGS. 3A-3C exemplarily illustrate a top perspective view, a top plan view, and a cross sectional view respectively, of the frame 101 of the gutter protection assembly 100. The mesh 103 as shown in FIG. 1, is positioned over the frame 101 to receive the water load and debris. The frame 101 comprises a frame with a corrugated shape with a rear brace 104 and the supporting flange 105 as exemplarily shown in FIG. 3C. The parallel ridges 109 extend longitudinally along the length of the frame 101 and the parallel channels 110 extend transversely along a width of the frame 101 to define a network of openings 111 that allow water to pass through to the gutter 107. The openings 111 are equally spaced to allow a uniform distribution of water load over the surface of the frame 101.

As shown in FIG. 3C, the frame 101 extends between the rear brace 104 and the supporting flange 105. The extension of the frame 101 between the rear brace 104 and the supporting flange 105 comprises crest sections 118 and trough sections 119. The crest sections 118 are configured to receive the support clips 117 of the self-supported stanchions 102, while the end and trough sections 119 serve as additional support to hold debris along with the mesh 103. The self-supported stanchions 102 are configured to vary the angle of positioning of the mesh 103 to counteract debris accumulation and water run-off from the roof. As disclosed under the description for FIGS. 1A-1B, the support clip 117 is manually adjustable to allow the inclination of the two self-supported stanchions 102 to be varied to reduce water run-off by manually moving the support clip 117. A user may manually move one or more of the support clips 117 from one crest section 118a to another crest section 118b as shown in FIG. 3C, so that the frame 101 and therefore, the mesh 103 is tilted to a desired angle, to effectively prevent run-off of water from the surface of the mesh 103. This self-supporting system defined by the gutter protection assembly 100 uses adjustable self-supported stanchions 102 to support the frame 101. This allows for adjustment of the gutter protection assembly 100 during installation and ensures that the proper elevation of the mesh 103 is established to ensure shedding of maximum debris accumulated in the gutter with little to no water overflow from the gutter.

The frame 101 is covered with a 10-150 micron mesh filter 103 that filters debris, allowing only water to enter the gutter 107, for example, a K-style gutter. Furthermore, micromesh technology is used to allow only water to enter the trough of the gutter 107. The frame 101 is made of aluminum, for example, 14-gauge aluminum, to ensure that there is no warping or any type of foreign shaping due to exposure to the external elements. The aluminum material disclosed above is not subject to melting, warping, rusting, or corroding and ensures longevity of the life span of the gutter protection assembly 100.

The structure of the self-supported stanchions 102 ensures that the gutter protection assembly 100 is a free-standing product that does not rely on a conventional roof line, shingle decking, or internal gutter hangers for support. Moreover, the self-supported stanchions 102 allow an operator to adjust the angle of the frame 101 of the gutter protection assembly 100 such that maximum debris shedding and minimal water overflow i.e., runoff is achieved by raising or lowering the angle of the frame 101 to achieve about a 16 degree inclination from the front to the back of the gutter 107. This type of installation of the gutter protection assembly 100 prevents "ice damming".

FIGS. 4A-4D exemplarily illustrates perspective views of the self-supported stanchions 102 of the gutter protection assembly 100. Each self-supported stanchion 102 comprises the base 114 that is curved at the edges and generally rectangular in geometry and an elongate stem portion 115 which is tapered along a taper section 115b and extends from the base 114. The elongate stem 115 is adjustably inclined relative to the base portion 114. The self-supported stanchion 102 also comprises two jaws 116 that extend from the end 115a of the elongate stem 115. The two jaws 116 define the support clip 117 that receives a portion of the parallel ridges 109 of the frame 101 as disclosed in the detailed description of FIG. 1A. The support clip 117 is manually adjustable to allow the inclination of the self-supported stanchions 102 to be varied to reduce water run-off by manually moving the support clip 117. A user can hold the taper section 115b and move the support clip 117 from one crest section 118a to another crest section 118b so that the frame 101 is tilted which in turn tilts the mesh 103 at a desired angle, which prevents run-off of water from the surface of the mesh 103.

The foregoing examples have been provided merely for explanation and are in no way to be construed as limiting of the gutter protection assembly 100 disclosed herein. While the gutter protection assembly 100 has been described with reference to various embodiments, it is understood that the words, which have been used herein, are words of description and illustration, rather than words of limitation. Furthermore, although the gutter protection assembly 100 has been described herein with reference to particular means, materials, and embodiments, the gutter protection assembly 100 is not intended to be limited to the particulars disclosed herein; rather, the gutter protection assembly 100 extends to all functionally equivalent structures, methods and uses, such as are within the scope of the appended claims. While multiple embodiments are disclosed, it will be understood by those skilled in the art, having the benefit of the teachings of this specification, that the gutter protection assembly 100 disclosed herein is capable of modifications and other embodiments may be effected and changes may be made thereto, without departing from the scope and spirit of the gutter protection assembly 100 disclosed herein.

We claim:

1. A gutter protection assembly comprising:
a frame comprising a rear brace and a supporting flange, the supporting flange configured to be detachably attached to a front lip of a gutter, wherein the frame is defined by a series of alternating parallel ridges extending longitudinally along a length of the frame and a series of parallel channels extending transversely along a width of the frame, wherein each of the parallel channels define a plurality of openings; and
at least two self-supported stanchions configured to support adjacent portions of parallel ridges of the frame, wherein each of the at least two self-supported stanchions comprise:
a base portion;
an elongate stem portion extending from the base portion, wherein the elongate stem portion is adjustably inclined relative to the base portion; and
at least two jaw portions extending from an end of the elongate stem portion distal from the base portion, wherein each of the at least two jaw portions define a support clip configured to receive a portion of the parallel ridges of the frame.

2. The gutter protection assembly of claim 1 further comprising a mesh covering the frame to filter debris through the gutter.

3. The gutter protection assembly of claim 2, wherein an extension of the frame between the rear brace and the supporting flange comprises a plurality of crest sections and trough sections, wherein the crest sections are configured to receive the support clip and the trough sections are configured to provide support to hold the debris along with the mesh.

4. The gutter protection assembly of claim 1, wherein the supporting flange is configured to be detachably attached to the front lip of the gutter using one or more fasteners.

5. The gutter protection assembly of claim 1, wherein the frame is corrugated in form.

6. The gutter protection assembly of claim 1, wherein each of the parallel channels define the plurality of openings that are equally spaced.

7. The gutter protection assembly of claim 1, wherein the at least two self-supported stanchions that are configured to support the adjacent portions of the parallel ridges define a space between a rear lip of the gutter and the rear brace of the frame.

8. The gutter protection assembly of claim 3, wherein the support clip is adjustable to vary the inclination of the at least two self-supported stanchions to reduce water run-off by manually shifting the support clip from one crest section to another crest section.

9. A pair of self-supported stanchions, each of said self-supported stanchions comprising:
a base portion;
an elongate stem portion extending from the base portion, wherein the elongate stem portion is adjustably inclined relative to the base portion; and
at least two jaw portions extending from an end of the elongate stem portion distal from the base portion, wherein each of the at least two jaw portions define a support clip configured to receive a portion of parallel ridges of a frame that supports a mesh, and wherein the support clips are adjustable to vary an inclination of the pair of self-supported stanchions to reduce water runoff from the mesh that is supported by the frame by manually shifting the support clips from one crest section to another crest section.

* * * * *